(12) United States Patent
Ruman

(10) Patent No.: US 6,352,056 B1
(45) Date of Patent: Mar. 5, 2002

(54) EXHAUST VALVE ACTUATOR FOR A TWO CYCLE ENGINE

(75) Inventor: Mark A. Ruman, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/602,120

(22) Filed: Jun. 23, 2000

(51) Int. Cl.[7] .............................................. F02B 75/02
(52) U.S. Cl. ................................................... 123/65 PE
(58) Field of Search .................................... 123/65 PE

(56) References Cited

U.S. PATENT DOCUMENTS

| | | | |
|---|---|---|---|
| 4,341,188 A | 7/1982 | Nerstrom | 123/324 |
| 4,364,346 A | 12/1982 | Shiohara | 123/323 |
| 4,388,894 A | 6/1983 | Tanaka et al. | 123/65 |
| 4,391,234 A | 7/1983 | Holzleitner | 123/65 |
| 4,399,788 A | 8/1983 | Bostelmann | 123/323 |
| 4,539,813 A | 9/1985 | Tomita et al. | 60/314 |
| 4,723,514 A | 2/1988 | Taniuchi | 123/65 |
| 4,829,946 A | 5/1989 | Boyessen | 123/65 |
| 4,986,780 A | 1/1991 | Sougawa | 440/89 |
| 5,873,334 A | 2/1999 | Heinrich | 123/65 |

OTHER PUBLICATIONS

"Personal Watercraft Illustrated", Aug., 2000, p. 26.

Primary Examiner—Tony M. Argenbright
Assistant Examiner—Katrina Harris
(74) Attorney, Agent, or Firm—William D. Lanyi

(57) ABSTRACT

An exhaust valve actuation system utilizes pressurized air provided by an air compressor and controlled by signals from a controller, such as an engine control module. The pressurized air is directed by a pressure valve that operates under the control of the controller and the exhaust valve is thus moved as a function of a preselected parameter monitored by the engine control module. The pressure valve can operate in a two position manner or a multi position manner, depending on the particular embodiment of the present invention utilized.

18 Claims, 3 Drawing Sheets

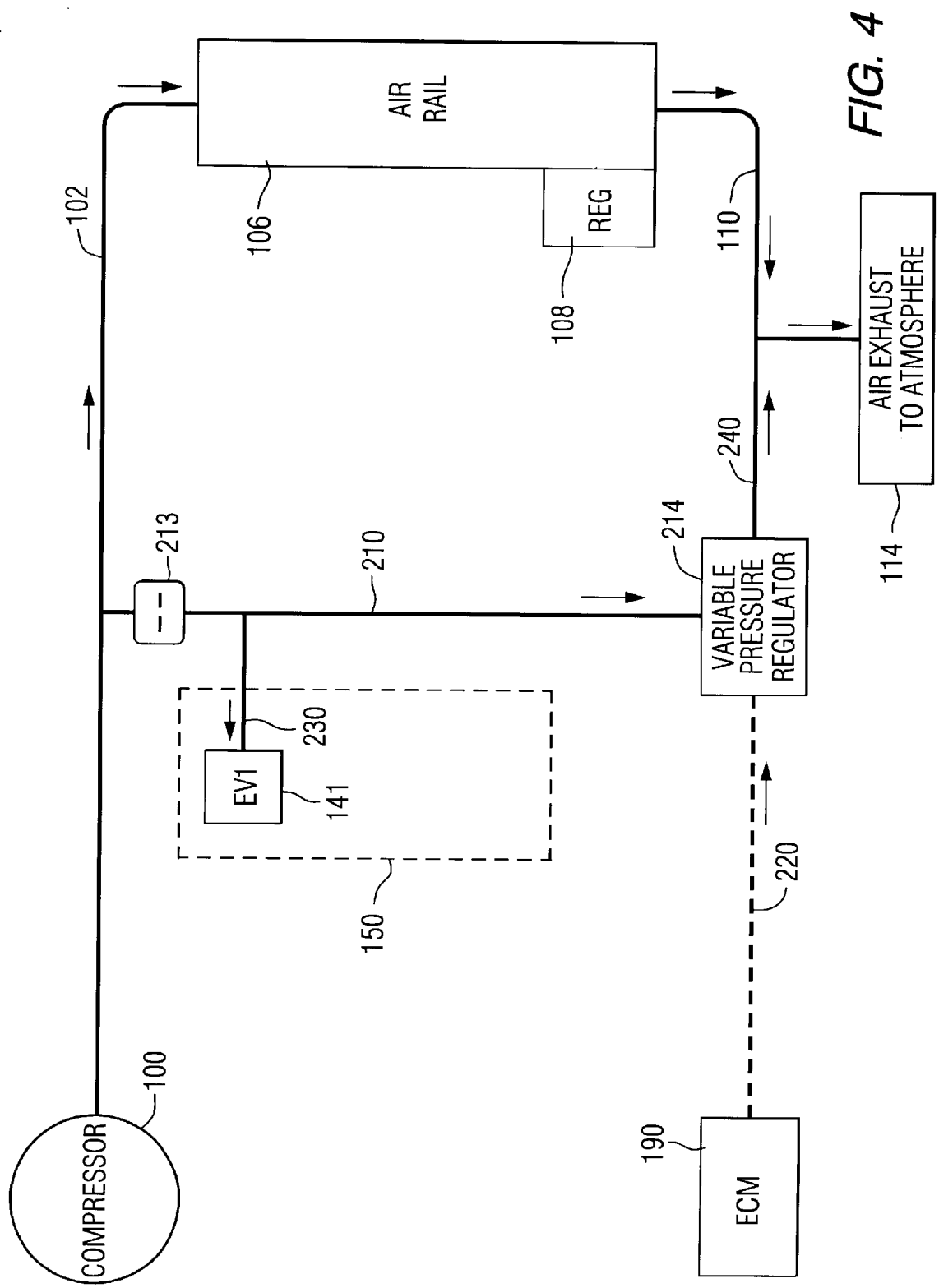

EXHAUST VALVE ACTUATOR FOR A TWO CYCLE ENGINE

BACKGROUND OF THE INVENTION

1. Field of the Invention

The present invention is generally related to an exhaust valve actuator and, more particularly, to an exhaust valve actuator that incorporates an air compressor to provide air pressure that is used to actuate an exhaust valve under the control of an engine control module.

2. Description of the Prior Art

Exhaust valves used in conjunction with two cycle engines are well known to those skilled in the art.

U.S. Pat. No. 4,539,813, which issued to Tomita et al on Sep. 10, 1985, describes an exhaust system control apparatus in an internal combustion engine. The exhaust system includes a subsidiary chamber connected to the normal exhaust passage with a valve for opening and closing communication between the chamber and exhaust passage to change the pressure wave at the engine cylinder exhaust port to provide optimum performance at high and low speeds. The chamber valve is operated rapidly by a pneumatic actuator supplied with compressed air from one or more of the sources disclosed, namely, a belt driven or electric air compressor and piston and a cylinder device extending between or forming the suspension components of a two wheeled vehicle. A pneumatic valve is operated by engine speed sensing means to supply or release the pressurized air to the actuator at a predetermined engine speed.

U.S. Pat. No. 5,873,334, which issued to Heinrich on Feb. 23, 1999, describes an exhaust valve system for a two cycle engine. The engine includes a cylinder having an exhaust port with an axial extent along the axis of the cylinder structure. An exhaust port valve is mounted adjacent to the exhaust port and is adjustable between a full flow position, in which the exhaust port valve exposes the exhaust port throughout its axial extent, and a restricting position, in which the exhaust port valve restricts the axial extent of the exhaust port. A valve control module is connected to the exhaust port valve and functions to adjust the exhaust port valve between the full flow and restricting positions in response to the cylinder bore gas pressure. At low speeds and low output conditions, the valve is in its restricting position. As the cylinder develops higher pressures at higher speeds and under higher output conditions, the valve control module moves the valve to its full flow position.

U.S. Pat. No. 4,986,780, which issued to Sougawa on Jan. 22, 1991, describes a two cycle engine and several embodiments of outboard motors embodying two cycle internal combustion engines which have an exhaust control valve and a decompression control valve that is operated in response to engine operating characteristics to improve performance and to reduce noise. Embodiments are disclosed wherein the control is in response to throttle valve position, engine speed and/or exhaust gas pressure.

U.S. Pat. No. 4,829,946, which issued to Boyesen on May 16, 1989, describes an exhaust control valve for a two cycle engine and a process for using the same. The control valve is located within the exhaust passage, seals against the piston, and delays opening of the exhaust passage to the combustion chamber during the expansion stroke of the piston for a preselected number of degrees of rotation of the crankshaft while permitting full opening of the exhaust port during the scavenging cycle. Also disclosed are means for modifying opening of the exhaust valve at high engine speeds to improve scavenging.

U.S. Pat. No. 4,723,514, which issued to Taniuchi on Feb. 9, 1988, describes an exhaust timing control system for a two cycle engine. The system incorporates a pivotally mounted control valve to selectively close the upper portion of an exhaust port in a two cycle engine including a motor coupled with the valve for driving the same. A speed determination means is provided to determine the engine speed relative to a specified value. A drive means rotates the motor in either direction based on the sensing by the speed determination means. A drive current control means detects the magnitude of change of the engine speed and increases or decreases the current supplied to the motor to increase or decrease the speed of change of the control valve.

U.S. Pat. No. 4,391,234, which issued to Holzleitner on Jul. 5, 1983, describes an internal combustion engine comprising means for controlling the axial extent of a port in a cylinder. In an engine comprising at least one cylinder having a port and a piston which is reciprocal to open and close the port, the effective axial extent of said port is adapted to be reduced by a restricting member which is movably mounted adjacent to a flow passage which adjoins the port. The restricting member has a restricting edge and is movable to a restricting position in which the restricting edge is substantially flush with the peripheral surface of the cylinder bore. The restricting member defines the exhaust passage on one side thereof adjacent to the exhaust port. In order to improve the cooling of the cylinder and the exhaust gas flow, the restricting member constitutes a hinged member which is pivoted on an axis at that end which is opposite to the restricting edge.

U.S. Pat. No. 4,388,894, which issued to Tanaka et al on Jun. 21, 1983, describes a two stroke engine having exhaust timing control valve means. The two stroke has an exhaust port formed in the cylinder wall. At the upper portion of the exhaust port, there is provided a rotary type exhaust timing control valve which is adapted to be actuated by an electric servo motor to control the exhaust timing in accordance with the engine speed. A control circuit is provided for controlling for a power supply to the servo motor in accordance with the engine speed and the position of the valve. A timer switch is provided for providing a power supply to the control circuit for a certain time after the engine ignition switch is turned off so that the valve is moved to the retracted position after the engine is stopped. As the valve is thus moved to the retracted position, carbon deposits on the valve are scraped off by a scraping edge formed in the cylinder.

U.S. Pat. No. 4,364,346, which issued to Shiohara on Dec. 21, 1982, describes an exhaust timing device for a two cycle engine. The device, in which a valve member functioning as the upper edge of an exhaust port that opens into the inner circumference of a cylinder is disposed in the upper wall of the exhaust passage from the exhaust port. A valve hole having an elongated cross section is opened in the wall of the exhaust passage in the vicinity of the exhaust port and is formed at the inclination with respect to the axis of the cylinder. The valve member is arranged slidably in the valve hole to that it can be retracted into the valve hole until the leading end portion thereof becomes substantially coextensive with the inner wall surface of the exhaust passage.

U.S. Pat. No. 4,341,188, which issued to Nerstrom on Jul. 27, 1982, describes a two cycle internal combustion engine which includes means for varying cylinder port timing. The engine includes an engine block having a cylindrical wall defining a cylinder having a head end, a piston mounted for reciprocative movement in the cylinder, and a passage in the engine block, such as an exhaust passage, a transfer passage, or a crankcase fuel intake passage, terminating at the cylinder wall in a port, such as an exhaust port, a transfer port, or a piston controlled, crankcase fuel intake port, having upper and lower edges. A valve mounted in the passage for movement relative to the port is operable to selectively vary the effective distance of one of the port edges from the cylinder head end and thereby provide the capability of varying the timing of the port opening and/or closing as required to obtain optimum engine performance at different operating conditions.

U.S. Pat. No. 4,399,788, which issued to Bostelmann on Aug. 23, 1983, described an internal combustion engine comprising means for controlling the axial extent of an exhaust port in a cylinder. In a two stroke cycle internal combustion engine, cylinder structure has an inside peripheral surface which defines a cylinder bore and is formed with an exhaust port, which has an axial extent along the axis of said cylinder bore and communicates with said exhaust system. A piston is axially reciprocal in said cylinder bore and adapted to open and close said port. A restricting member is mounted in said cylinder structure adjacent to said port and adjustable between a full flow position, in which said restricting member exposes said exhaust port throughout its axial extent, and a restricting position, in which said restricting member restricts the axial extent of said exhaust port. A positioning drive is operatively connected to said restricting member and operable to adjust said restricting member between said full flow and restricting positions. The positioning drive is adapted to be controlled in dependence on the exhaust gas pressure in said exhaust gas system.

The above United States patent are hereby explicitly incorporated by reference in the description of the present invention.

Exhaust valves are typically provided to allow an engine to operate more efficiently and effectively at low operating speeds even though they are generally tuned for operation at higher speed ranges. When an engine is tuned for its best operation at higher speeds, low speed power is often compromised. This is particularly true for fixed geometry exhaust systems which are commonly used in outboard motor applications. As a result, acceleration performance at lower engine speeds is often less than desired. By providing an exhaust valve, certain advantages can be achieved. For example, exhaust emissions of unburned hydrocarbons can be minimized if the exhaust port size is reduced when the engine is operating at low speeds. Furthermore, the gas dynamic behavior of exhaust systems typically exhibit an expansion wave and a compression wave which arrive at the exhaust port at certain times during each cycle of the engine. By selectively altering the effective cross sectional area of the exhaust conduit of an engine, these expansion and compression waves can be used advantageously instead of occurring deleteriously. These and other advantages of exhaust valves are well known to those skilled in the art.

Exhaust valves known in the prior art are typically actuated by exhaust pressure, cylinder pressure, or by stepper motors. The use of exhaust pressure is generally undesirable since it can be affected by outboard motor installation and by boat operating conditions. Cylinder pressure activation is undesirable in many cases because the cylinder pressure can be affected by cylinder combustion quality. The use of a stepper motor is usually prohibitably expensive, especially when it is considered that many engines have multiple cylinders and each cylinder may require an individual stepper motor for these purposes.

It would therefore be significantly beneficial if a means for actuating an exhaust valve could be provided without the disadvantages incumbent with exhaust pressure actuation, cylinder pressure actuation, and stepper motor actuation.

SUMMARY OF THE INVENTION

An exhaust valve control system for an internal combustion engine, principally an outboard motor engine, made in accordance with the present invention comprises a compressor, a controller, an exhaust valve associated with the exhaust conduit of a cylinder of the engine, and a pressure valve. The pressure valve is connected in signal communication with the controller, which can be an engine control module or engine control unit, and is connected in fluid communication with the compressor. The compressor provides actuating pressure for the exhaust valve and this pressure is ported to the exhaust valve through the pressure valve. The controller determines the position of the exhaust valve relative to the exhaust conduit by controlling the pressure valve as a function of at least one operating parameter of the internal combustion engine. The exhaust valve is disposed within the exhaust conduit of a cylinder of the engine and within the exhaust flow stream emanating from the exhaust port of the cylinder and flowing through the exhaust system.

The exhaust valve can be a two position valve in which a first position completely opens the exhaust conduit and a second position completely closes the exhaust conduit. Alternatively, the exhaust valve can be movable to any one of a plurality of positions between fully closed and fully opened.

The exhaust valve control system of the present invention can further comprise an air rail connected in fluid communication with a compressor and a pressure regulator connected in fluid communication with the air rail to maintain a preselected pressure within the air rail. The system can further comprise an engine speed sensor connected in signal communication with the controller, wherein the controller determines the position of the exhaust valve relative to the exhaust conduit by controlling the pressure valve as a function of an engine speed signal received by the controller from the engine speed sensor. Alternatively, the system can comprise an engine load sensor in which the controller controls the position of the exhaust valve as a function of an engine load signal received from the engine load sensor.

The pneumatic circuit of the present invention can further comprise a pressure accumulator connected in fluid communication with the air compressor and, in certain embodiments, between the air compressor and the air rail.

BRIEF DESCRIPTION OF THE DRAWINGS

The present invention will be more fully and completely understood from a reading of the description of the preferred embodiment in conjunction with the drawings, in which:

FIG. 4 shows an alternative embodiment of the present invention.

DESCRIPTION OF THE PREFERRED EMBODIMENT

Figure 1:
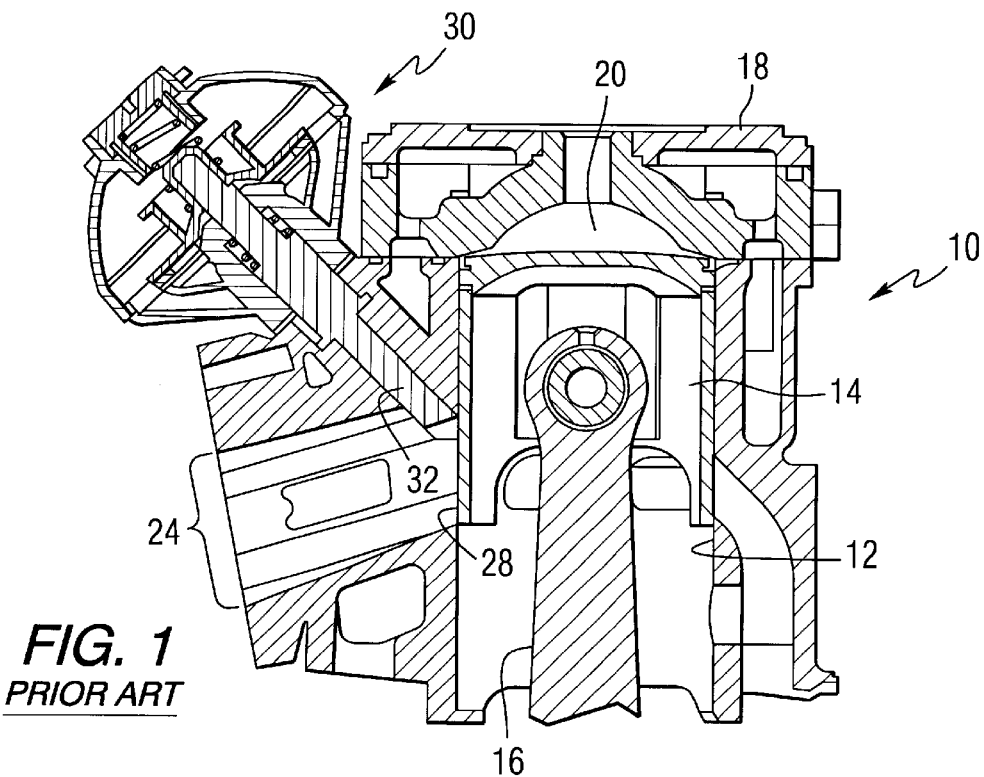
FIG. 1 shows a typical exhaust valve associated with a cylinder of an internal combustion engine.

Throughout the description of the preferred embodiment of the present invention, like components will be identified by like reference numerals.

FIG. 1 is a typical engine with an exhaust valve, such as that disclosed in detail in U.S. Pat. No. 5,873,334, described above. An engine 10 comprises a cylinder 12 in which a piston 14 is slidably disposed for reciprocation within the cylinder 12. A connecting rod 16 connects the piston 14 to a crankshaft (not shown in FIG. 1). A head 18 of the engine 10 defines a combustion chamber 20. An exhaust passage 24, or exhaust conduit, intersects the cylinder 12 as shown and a transfer port 28 also intersects the cylinder 12 as shown. An exhaust valve device 30 controls the reciprocal movement of an exhaust valve 32 that can selectively block a portion of the exhaust conduit 24. The movement of the exhaust valve 32 into a restricting or non restricting position relative to the exhaust conduit 24 is controlled by some force, which can be provided by harnessing the exhaust pressure within the exhaust conduit 24, cylinder pressure within the cylinder 12, or by providing an external motive means such as a stepper motor.

Figure 2:
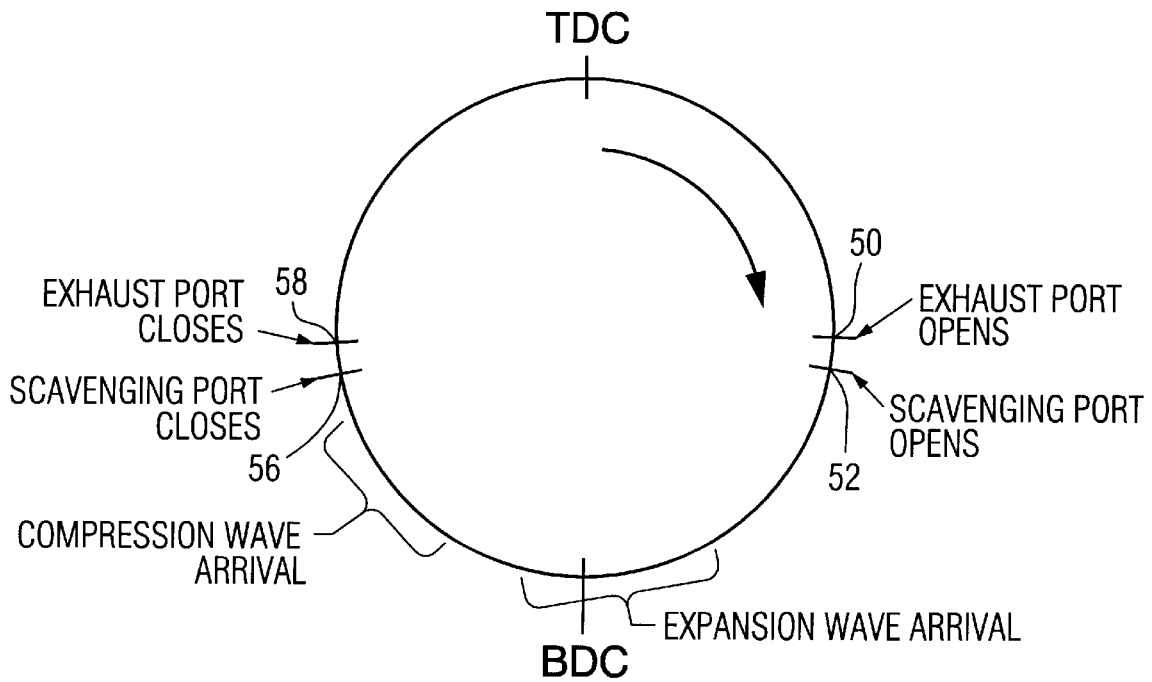
FIG. 2 is a simplified timing diagram showing the opening and closing of exhaust and transfer ports relative to the movement of a piston within a cylinder from top dead center to bottom dead center positions.

FIG. 2 is a highly simplified representation of a timing diagram for an internal combustion engine. As the piston rotates from a top dead center (TDC) position within the cylinder 12 to a bottom dead center (BDC) within the cylinder 12, various important events occur. At some point, such as approximately 92 degrees rotation from top dead center (TDC), as identified by reference numeral 50 in FIG. 2, the exhaust port 24 opens. Then, as the piston 14 continues to move downward within the cylinder 12, the transfer port opens at point 52. This can occur at approximately 120 degrees rotation from top dead center (TDC). At some time following the opening of the scavenging port 28, and as the fuel air mixture is flowing from the crankcase into the cylinder 12 above the piston 14, an expansion wave returns along the exhaust conduit 24 toward the cylinder 12. This expansion wave is created by the unsteady action of the exhaust flow through the exhaust system and the shape and size of the exhaust system itself. Although the precise timing of the expansion wave return will vary from one system to another, as a function of many variables, it is desirable that it occur after the scavenging port opens at point 52. This expansion wave is advantageous because it helps to draw exhaust from the region of the combustion chamber 20 within the cylinder 12. As the piston reaches its bottom dead center (BDC) position and begins to move upward within the cylinder 12, it is desirable to have a compression wave to travel along the exhaust conduit 24 toward the cylinder 12 as a natural function of the exhaust gas dynamics generated within the exhaust conduit 24 and the geometry of the exhaust system. This returning pressure pulse, or compression wave, typically occurs prior to the exhaust port 28 being closed by the upwardly moving piston 14. A return of this compression wave prior to the closing of the exhaust port at point 56 in FIG. 2 can be advantageous because it tends to increase the mass of fresh charge within the cylinder as the exhaust port is closing. This is advantageous because it increases the density of the fuel air mixture within the cylinder and, as a result, the heat release of the subsequent combustion cycle event. The exhaust conduit 24 closes at point 58 as the piston continues toward its top dead center (TDC) position. In a typical application, the scavenging port closes at point 56 at approximately 240 degrees of rotation of the crankcase from top dead center (TDC) and the exhaust closes at approximately 268 degrees after top dead center (TDC).

In relative terms, the timing between the expansion wave return and the compression wave return remains generally constant, but these events move away from points 52 and 56, respectively, in terms of absolute timing when the engine speed is reduced from the tuned condition. In other words, the elapsed time between the expansion wave return and the compression wave return is generally fixed and determined as a function of the exhaust gas temperature (speed of sound) and the geometry of the exhaust system. However, the absolute time between points 52 and 56 can increase significantly at low engine speeds. As a result, the absolute time that elapses between the exhaust port opening at point 50 and the expansion wave return increases at low engine speeds and the absolute time between the compression wave return and the exhaust port opening at point 50 also increase at low engine speeds. As a result, engine efficiency and power production at low engine speeds is reduced. Providing an engine with an exhaust valve can correct these deficiencies at low engine operating speeds. By partially closing the exhaust conduit 24, the piston will reach the effective upper edge of the exhaust conduit 24 faster during its upward movement within the cylinder 28 than if the exhaust valve 32 is in its upward retracted position. In addition, as the piston 14 moves downward during the power portion of the cycle, the exhaust port will open at a later time because the effective upper edge of the exhaust conduit 24 is lowered relative to the cylinder 12 and the path of the piston 14.

Figure 3:
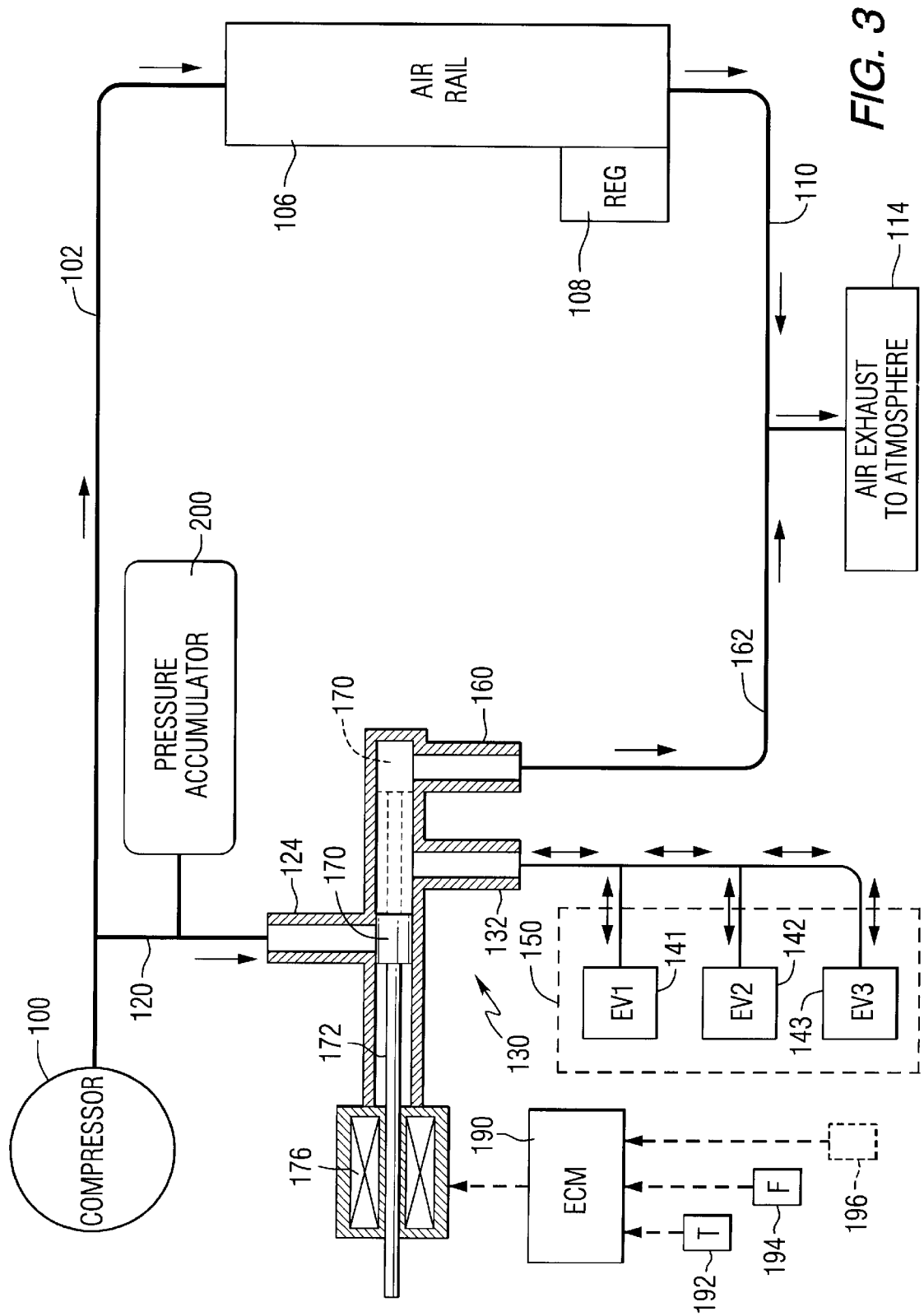
FIG. 3 shows a first embodiment of the present invention.

FIG. 3 is a schematic representation of the present invention. In certain outboard motor applications, the internal combustion engine used is provided with a direct fuel injection (DFI) system in which an air compressor 100 is used. The air compressor provides compressed air, through line 102, to an air rail 106 that is used to pressurize fuel injectors. In a direct fuel injected (DFI) engine, each cylinder is provided with a fuel injector that injects fuel directly into the combustion chamber 20 of the cylinder 12. A pressure regulator 108 regulates the pressure within the air rail 106 and excess pressurized air is exhausted through line 110 to the atmosphere as represented by reference numeral 114 in FIG. 3. The present invention makes use of the air compressor and its ability to provide a stream of pressurized air by directing some of that pressurized air, through line 120, to an inlet 124 of a pressure valve 130. The pressure valve has a first outlet 132 that is connected in fluid communication with one or more exhaust valves, identified by reference numerals 141–143. The exhaust valves are schematically shown within a dashed box 150 that represents the internal combustion engine of an outboard motor. It should be understood that the precise configuration of the exhaust valves, EV1, EV2, and EV3, is not limiting to the present invention. Any type of exhaust valve that requires an actuating force can be used in conjunction with the present invention which provides the actuating force and control system for the exhaust valves of an internal combustion engine.

A second outlet 160 of the pressure valve 130 is connected to an exhaust line 162 that provides an exhaust to the atmosphere, as represented by reference numeral 1 14.

With continued reference to FIG. 3, the pressure valve 130 comprises a piston 170 and an actuating rod 172 that is movable under the force of a solenoid 176. The piston 170 is shown in a solid line representation at a first position and in a dotted line representation at a second position in FIG. 3. Movement from the first position to the second position is caused by actuation of the solenoid 176 under the control of a controller 190, such as an engine control module (ECM). The controller 190 can receive signals from a tachometer 192, a fuel measurement sensor 194, or another type of sensor represented by reference numeral 196 and the associated dashed box in FIG. 3. The precise type of parameter measured and provided to the controller 190 for control of the pressure valve 130 is not limiting to the present invention. It can be a tachometer 192 which measures engine speed, a fuel flow sensor 194, such as a software routine in the ECM, which monitors the fuel provided to each cylinder of the engine 150, or any other type of sensor 196. When in the retracted position, the inlet 124 is blocked and the first and second outlets, 132 and 160, are connected in fluid communication with each other. This allows the pressure on all of the exhaust valves, 141–143, to be released through the exhaust line 162. This would place the exhaust valves in their retracted positions in which the exhaust conduits are in a completely opened condition. When the piston 170 is moved toward the right under the force solenoid 176 and the control of the controller 190, the second outlet 162 is blocked and the first outlet 132 is connected in fluid communication with the inlet 124 to provide pressurized to all of the exhaust valves, 141–143. This actuates the exhaust valves and partially closes the exhaust conduits 24.

In a particularly preferred embodiment of the present invention, a pressure accumulator 200 is provided to prevent undesirable pressure pulses in line 102 when piston 170 is moved from one position to another.

With continued reference to FIG. 3, it can be seen that the pressure valve 130 is of the type that can assume either one of two positions. In the first position, the exhaust valves are all fully opened and in the second position they are all fully closed. An alternative arrangement is described below in conjunction with FIG. 4.

In FIG. 4, the compressor 100 is connected to the air rail 106 through line 102 and a regulator is provided to maintain a desired and preselected pressure within the air rail 106. Excess air is exhausted through line 110 to the atmosphere as represented by reference numeral 114. In FIG. 4, only one exhaust valve 141 is shown in the outboard motor engine 150 although it should be understood that any number of exhaust valves can be associated with the invention as shown in FIG. 4. The pressure provided by the compressor 100 is conducted through line 210 and orifice 213 to the exhaust valve 141 and to a variable pressure regulator 214 as shown. The controller 190, such as an engine control module (ECM) provides a control signal on line 220 to the variable pressure regulator 214 to select a desired pressure in line 210 and in line 230 which directly affects the exhaust valve 141. In this way, control of the variable pressure regulator 214 can select a pressure in line 230 which can control the position of the exhaust valve 141 to any one of a plurality of positions between fully opened and fully closed. Excess pressure, above that desired in line 210, is exhausted through line 240 to the atmosphere as represented by reference numeral 114.

It should be understood that the use of a variable pressure regulator 214 can be used in many differently configured pneumatic circuits. The exhaust valves 141 can be connected between the air rail 106 and the atmosphere exhaust 114, with the air rail 106 being connected between the exhaust values 141 and the compressor 100. In addition, each exhaust valve 141 could be provided with a position sensor, such as an LVDT, to allow the pressure regulator 214 to be controlled as a function of the desired position and the actual position of each exhaust valve 141. This type of control loop is within the knowledge of the skilled artisan and won't be described in the detail herein.

The differences between the embodiments shown in FIG. 3 and FIG. 4 relate to the ability of the control system in FIG. 4 to select many different positions for the exhaust valve 141, whereas the arrangement in FIG. 3 is designed to select either a fully opened or fully closed position of the exhaust valve.

Since the compressor 100 is already available on direct fuel injected (DFI) engines, the pressurized air can be provided at no additional cost of manufacturer. The air provides a convenient and available motive force to actuate the exhaust valves, whether the exhaust valves are two position valves or multi-positioned valves. It should be understood that more than one valve may be used on more than one exhaust port in a given cylinder. The valve or valves can be located in a main exhaust passage or can be placed in an auxiliary exhaust port to control passage area and port timing.

Although the present invention has been described with particular detail and illustrated to show two particularly preferred embodiments, it should be understood that alternative embodiments are also within its scope.

I claim:

1. An exhaust valve control system for an internal combustion engine, comprising:

a compressor;

a controller;

an exhaust valve associated with an exhaust conduit of a cylinder of said engine, said exhaust conduit intersecting said cylinder at an exhaust port formed in a wall of said cylinder, said exhaust valve being movable relative to said exhaust port to change the effective area of said exhaust port;

a pressure valve, connected in signal communication with said controller and connected in fluid communication with said compressor, for regulating the position of said exhaust valve relative to said exhaust port, said controller determining the position of said exhaust valve relative to said exhaust port by controlling said pressure valve as a function of at least one operating parameter of said internal combustion engine;

an air rail connected in fluid communication with said compressor; and a pressure regulator connected in fluid communication with said air rail to maintain a preselected pressure within said air rail.

2. The system of claim 1, wherein:

said exhaust valve is a two position valve, in which a first position completely opens said exhaust port and a second position partially closes said exhaust port.

3. The system of claim 1, wherein:

said exhaust valve is movable to any one of a plurality of positions between said exhaust port being partially closed and said exhaust port being fully opened.

4. The system of claim 1, further comprising:

an engine speed sensor connected in signal communication with said controller, said controller determining the position of said exhaust valve relative to said exhaust port by controlling said pressure valve as a function of an engine speed signal received by said controller from said engine speed sensor.

5. The system of claim 1, further comprising:

an engine load sensor connected in signal communication with said controller, said controller determining the position of said exhaust valve relative to said exhaust port by controlling said pressure valve as a function of an engine load signal received by said controller from said engine load sensor.

6. The system of claim 1, further comprising:

a pressure accumulator connected in fluid communication with said air compressor.

7. An exhaust valve control system for an internal combustion engine, comprising:

a compressor;

a controller;

an exhaust valve associated with an exhaust conduit of a cylinder of said engine, said exhaust conduit intersecting said cylinder at an exhaust port formed in a wall of said cylinder, said exhaust valve being movable relative to said exhaust port to change the effective area of said exhaust port;

a pressure valve, connected in signal communication with said controller and connected in fluid communication with said compressor, for regulating the position of said exhaust valve relative to said exhaust port, said controller determining the position of said exhaust valve relative to said exhaust port by controlling said pressure valve as a function of at least one operating parameter of said internal combustion engine; and an air rail connected in fluid communication with said compressor.

8. The system of claim 7, wherein:

said exhaust valve is a two position valve, in which a first position completely opens said exhaust port and a second position completely closes said exhaust port.

9. The system of claim 8, further comprising:

a pressure regulator connected in fluid communication with said air rail to maintain a preselected pressure within said air rail.

10. The system of claim 9, further comprising:

an engine speed sensor connected in signal communication with said controller, said controller determining the position of said exhaust valve relative to said exhaust port by controlling said pressure valve as a function of an engine speed signal received by said controller from said engine speed sensor.

11. The system of claim 9, further comprising:

an engine load sensor connected in signal communication with said controller, said controller determining the position of said exhaust valve relative to said exhaust port by controlling said pressure valve as a function of an engine load signal received by said controller from said engine load sensor.

12. The system of claim 11, further comprising:

a pressure accumulator connected in fluid communication with said air compressor and said air rail.

13. The system of claim 11, further comprising:

a pressure accumulator connected in fluid communication with said air compressor.

14. The system of claim 7, wherein:

said exhaust valve is movable to any one of a plurality of positions between said exhaust port being partially closed and said exhaust port being fully opened.

15. An exhaust valve control system for an internal combustion engine of a marine propulsion device, comprising:

a compressor;

a controller;

an exhaust valve associated with an exhaust conduit of a cylinder of said engine, said exhaust conduit intersecting said cylinder at an exhaust port formed in a wall of said cylinder, said exhaust valve being movable relative to said exhaust port to change the effective area of said exhaust port, said exhaust valve being a two position valve, in which a first position completely opens said exhaust port and a second position completely closes said exhaust port;

a pressure valve, connected in signal communication with said controller and connected in fluid communication with said compressor, for regulating the position of said exhaust valve relative to said exhaust port, said controller determining the position of said exhaust valve relative to said exhaust port by controlling said pressure valve as a function of at least one operating parameter of said internal combustion engine; and an air rail connected in fluid communication with said compressor.

16. The system of claim 15, further comprising:

a pressure regulator connected in fluid communication with said air rail to maintain a preselected pressure within said air rail.

17. The system of claim 16, further comprising:

an engine speed sensor connected in signal communication with said controller, said controller determining the position of said exhaust valve relative to said exhaust conduit by controlling said pressure valve as a function of an engine speed signal received by said controller from said engine speed sensor.

18. The system of claim 17, further comprising:

an engine load sensor connected in signal communication with said controller, said controller determining the position of said exhaust valve relative to said exhaust port by controlling said pressure valve as a function of an engine load signal received by said controller from said engine load sensor.

* * * * *